United States Patent [19]

Kasprzak

[11] 3,825,677

[45] July 23, 1974

[54] TELEVISION SCAN CONVERTER BANDWIDTH REDUCTION DEVICE

[75] Inventor: Vincent D. Kasprzak, Auburn, Calif.

[73] Assignee: Arvin Industries, Inc., Columbus, Ind.

[22] Filed: Mar. 7, 1973

[21] Appl. No.: 338,667

Related U.S. Application Data

[63] Continuation-in-part of Ser. No. 283,806, Aug. 25, 1972.

[52] U.S. Cl. ......... 178/6.8, 178/DIG. 3, 178/DIG. 7, 178/DIG. 24, 179/2 TV, 179/15.55 T

[51] Int. Cl. ............................................. H04n 7/12

[58] Field of Search ............. 178/6.8, DIG. 3, 6.6 A, 178/6.6 D, 6.6 P, 6.6 FS, DIG. 24; 179/15.55 T, 2 TV

[56] References Cited

UNITED STATES PATENTS

| | | | |
|---|---|---|---|
| 2,955,157 | 10/1960 | Young | 178/6.6 A |
| 3,027,425 | 3/1962 | Tannenbaum | 179/15.55 T |
| 3,526,900 | 9/1970 | McCoy | 178/6.6 DD |
| 3,564,127 | 2/1971 | Sziklai | 178/6.6 DD |

*Primary Examiner*—Howard W. Britton
*Attorney, Agent, or Firm*—Biebel, French & Bugg

[57] ABSTRACT

A television signal is transmitted over a narrow bandwidth transmission line or recorded over a narrow bandwidth recording device by scan converting the television signal a line at a time from a disc magnetic recorder. Each line of the video signal is loaded at high frequency into a variable delay line or storage element whose electrical length exactly equals a television line; the delay line is then switched to operate at a longer electrical length to convert the television line into a narrow bandwidth signal. Playback is accomplished by loading the low frequency signal into a variable delay line and then operating the delay line at the original, high frequency rate to unload the scan line into a disc magnetic recorder at the original high bandwidth. The video signal is reassembled a line at a time onto the receiver disc magnetic recorder for playing back the original video frame at the original high frequency and bandwidth.

8 Claims, 5 Drawing Figures

$f_b$ = BASEBAND BANDWIDTH $f_s$ = SAMPLE FREQUENCY

TELEVISION SCAN CONVERTER BANDWIDTH REDUCTION DEVICE

CROSS REFERENCE TO RELATED APPLICATIONS

This application is a continuaion-in-part of my co-pending U.S. application Ser. No. 283,806, filed Aug. 25, 1972, entitled Video Bandwidth Reduction, and assigned to the assignee of the present invention.

BACKGROUND OF THE INVENTION

This invention relates to recording and transmission systems, and more particularly to a video bandwidth reduction system for transmitting high resolution, high bandwidth television signals over low frequency, narrow bandwidth transmission and/or recording systems.

As is well known, the cost of recording and transmitting equipment for high frequency signals increases substantially as the frequency capacity of the system is increased. It is thus highly desirable to reduce the bandwidth (maximum frequency of the signal) as much as possible, especially where the need within the system for high frequency capacity is only intermittent in nature. Thus, for example, where it is not necessary to transmit and/or record a moving video picture in real time (that is, as it actually is occurring or is to be viewed), or where the video signal is a fixed display (for example, a chart or diagram as part of an instructional program), it is then possible to transmit or record the video information at a much slower rate--and hence much lower bandwidth--consistent with the frequency capacity of a lower bandwidth transmission and/or recording system.

Various systems for transmitting and/or recording video television signals at lower bandwidth have been proposed. Generally, they use the fact that a video signal can be transmitted and/or recorded at a lower bandwidth, without loss of resolution, by transmitting and/or recording the signal on a frame by frame basis at a slower rate. As suggested, this approach is fully applicable to systems where playback need not be effected immediately, as well as to display systems where the picture, once constructed, is to remain unchanged for a considerable period of time. Examples of the former include prerecording a program for later reproduction. Examples of the latter include instructional programs where a given display is repeatedly shown on a video tube. In the latter case, the duration of the display provides adequate transmission time for reconstruction of the next following picture or display, and so on.

One method of reducing the bandwidth of such a signal is simply to record it on a magnetic recording tape or disc and play the recording back at a slower rate. After reception, the tape or disc is speeded up to the original speed to reproduce the original signal. One difficulty with simply slowing down a video tape lies in the losses which result when the speed is reduced by an appreciable factor, setting a limit on the amount of bandwidth reduction which can be obtained.

Another approach involves periodic sampling of the video field, an example of which is set forth in U.S. Pat. No. 3,564,127. See also U.S. Pat. Nos. 2,694,748, 2,794,066, and 2,817,701. However, sampling systems require very high sampling rates and commonly require discrete and separate sampling of the entire video field, and separating the sampled signal into a plurality of channels. They thus present design and cost problems, since sample feed through, amplitude differences and phase differences can cause unwanted interference signals to be added to the video signal, and steps must be taken to compensate. This often requires expensive equipment as well as filtering and equalization networks.

SUMMARY OF THE INVENTION

Briefly, this invention provides a method and apparatus for recording and/or transmitting high resolution (high bandwidth) video television signals over any narrow bandwidth channel, such as telephone lines, home tape recorders, and so on.

The television signal is scan converted a line at a time by reading or loading each entire video scan line individually into a variable storage means or delay line.

The delay line may be operated at various speeds including high speed and low speed modes. Each video line is written into the delay line when operating in high speed mode, and the delay line is then operated at low speed mode for recovery of the particular video line as a signal of considerably reduced bandwidth. The lower bandwidth signal is then recorded and/or transmitted, as desired. After the entire video line has been recorded and/or transmitted, the next video line is read into the variable delay line at high speed and similarly reduced in bandwidth for recording and/or transmission. By this means, the entire video signal is scan converted for recording and/or transmission.

Playback is accomplished by reconstructing the original signal by assembling it a line at a time at the original bandwidth frequency. The narrow bandwidth signal is first loaded a line at a time into a variable storage means or a delay line operated at low speed mode, and the loaded delay line is then operated at high speed mode for recording the particular scan line onto a disc magnetic recorder at the original high bandwidth frequency. The television signal is thus reconstructed a line at a time onto the disc magnetic recorder in the receiver, and the original high bandwidth signal is recovered without loss of resolution.

The number of storage elements required in the variable delay line is specified according to the number of lines of resolution desired along the horizontal axis, with allowance made for a guardband bandwidth to provide for adequate suppression of sampling frequency generated noise.

It is therefore an object of this invention to provide a method and apparatus for transmitting, recording and/or receiving television signals over narrow bandwidth media by scan converting the television signal a line at a time to a signal of lower bandwidth and then reconstructing the lower bandwidth signal a line at a time for playing back the original signal at the original frequency; a bandwidth conversion system including means for controllably presenting a pre-recorded television signal one video scan line at a time at normal high frequency bandwidth; having a storage means or delay line with selectable high and low speed modes; having controlling means for scan converting the television signal a line at a time; and to accomplish all the above objects and purposes in an inexpensive, uncomplicated, practical and durable configuration fully compatible with existing recording and/or transmitting facilities to enable the television signal to be handled thereby without loss of resolution.

Other objects and advantages of the invention will be apparent from the following description, the accompanying drawings and the appended claims.

DESCRIPTION OF THE PREFERRED EMBODIMENTS

Figure 1:
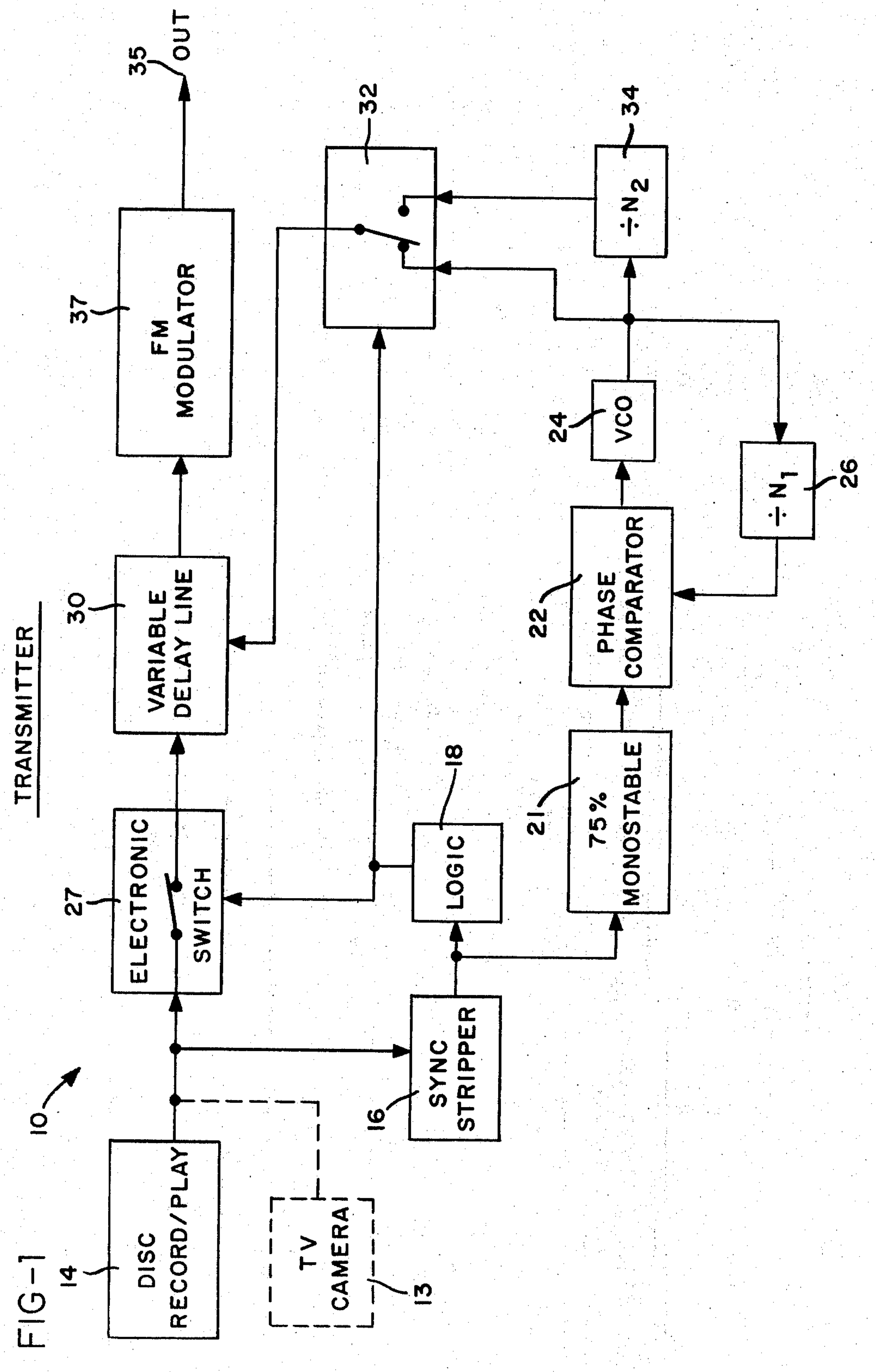
FIG. 1 is a block diagram of a transmitting system according to the present invention.

With reference to the drawings, and more particularly to FIG. 1, there is illustrated a transmitter system 10 for scan converting a television video signal according to this invention.

A still frame of a television signal from a television camera 13, or from a disc recorder 14, is continually read into transmitter 10 for processing thereby. A sync stripper 16 presents synchronization pulse information to a logic circuit 18 through a 75 percent monostable pulsing circuit 21. The 75 percent monostable pulsing circuit 21 eliminates the extra seration pulses occurring during the vertical interval, while passing horizontal pulse information to a phase comparator 22 which controls a voltage controlled oscillator (VCO) 24 to lock the VCO onto a harmonic of the horizontal sync. Since the VCO operates at a frequency greater than the horizontal sweep frequency (for reasons subsequently explained), a feedback loop from the VCO for the phase comparator passes through a $\div N_1$ (divide by $N_1$) counter 26 to count the VCO rate down to the horizontal sync rate for comparison in the phase comparator.

An electronic switch 27 is controlled by logic circuit 18 to connect the disc magnetic recorder signal source 14 to a variable delay line storage means 30. The variable storage means or delay line 30 is capable of receiving or sending signals at any of a broad range of controllable rates. Such devices are known in the art, as may be seen, for example, in "The New Concept for Memory and Imaging: Charge Coupling" (Electronics Magazine, June, 1971, Page 50), and in "Pass the Bucket" (The Electronic Engineer, December, 1971, Page 12). See also Electronics Magazine, Jan. 18, 1973, pp. 162–169, and U.S. Pat. No. 3,553,356, Col. 6, lines 68–69. The variable delay line can also be implemented by processing the signal through an A/D converter, transmitting the digital information through digital shift registers (digital delay lines) and then converting the information back to an analog format by processing the digital signal through a D/A converter. However, although it is possible to use the digital technique, charge coupling and bucket brigade are the preferred embodiment of this invention. In the present invention, the delay line is operated in either a low speed or high speed mode.

When delay line 30 is ready to receive a line of the video signal, logic circuit 18 monitors the output of the camera 13 or disc magnetic recorder 14 (through sync stripper 16) to determine the commencement of the particular video scan line to be transmitted. At the appropriate time the logic circuit closes electronic switch 27 to supply the video signal to variable delay line 30. An electronic switch 32 is also operated to connect the voltage controlled oscillator or clock 24 to delay line 30 to clock line 30 in the high speed mode to load the selected scan line into the delay line.

After the particular scan line has been loaded into line 30, logic circuit 18 opens switch 27 and switches electronic switch 32 to an electronic divider circuit $\div N_2$ which reduces the clock frequency by the factor of $N_2$ to clock the scan line out of delay line 30 at a slower rate. $N_2$ is chosen to control the slow mode frequency of the delay line, and is adjusted according to the frequency capacity of the channel means, such as a recording and/or transmitting means, (not shown) connected to the transmitter output terminal 35. The signal appearing on output terminal 35 is then a signal with frequency and bandwidth reduced by the factor $N_2$, relative to the frequency at which the signal was clocked into delay line 30. The optional FM modulator 37 is shown since video signals sometimes require response capabilities down to DC. The FM modulator may therefore be necessary where the recording and/or transmitting means connected to output terminal 35 does not have such low frequency capability.

Figure 2:
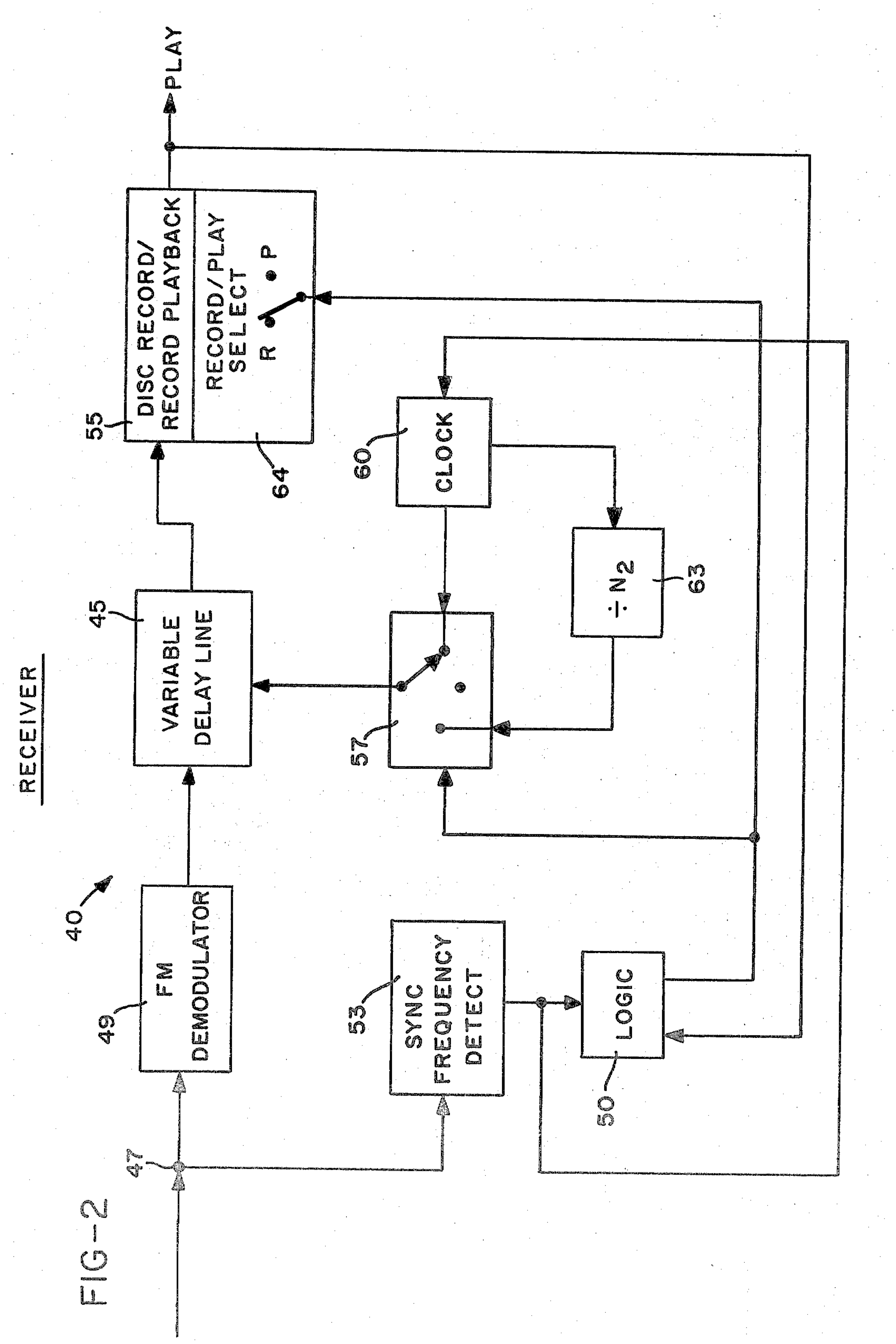
FIG. 2 is a block diagram of a receiving system according to the present invention.

FIG. 2 illustrates a receiver 40 for receiving the narrow bandwidth television signal transmitted by transmitter 10 (either through an interconnecting transmission line or through an intermediate recording device). Receiver 40 reconstructs and assembles the television video signal one scan line at a time, raising it to the original high bandwidth frequency for ultimate playback of the original video frame at the original frequency.

Receiver 40 includes a variable delay line storage means 45, similar to delay line 30, which receives the low bandwidth signal from an input terminal 47. An optional FM demodulator 49 may be included where the transmitter 10 included an FM modulator 37. A logic circuit 50 controls the operation of receiver 40, receiving synchronization information from a sync frequency detect circuit 53 and a disc magnetic recorder 55. When an incoming signal appears on input terminal 47, logic circuit 50 operates an electronic switch 57 to apply a clock signal from clock 60 to delay line 45, through a divider circuit 63 operating on the same $\div N_2$ ratio as transmitter divider circuit 34. Clock 60 runs at the same frequency as clock 24, causing the low frequency, low bandwidth scan line to be clocked and loaded into delay line 45.

The clock 60 frequency is controlled and determined by the FM sync tip frequency which can be chosen to be harmonically related to the clock frequency of the voltage controlled oscillator 24 of the transmitter 10. This can be accomplished with circuitry similar to recovering the color burst frequency from the back porch of chroma video signals, with the addition of binary dividers and phase locked loops in order to restore the proper harmonic relationship between the receiver clock and the sync tip frequency. As indicated, the clock frequency and $\div N_2$ are the same for both transmitter 10 and receiver 40.

After the particular scan line has been loaded into delay line 45, logic circuit 50 switches switch 57 to an off position so that no clock pulses are applied to the delay line. Line 45 thus holds the scan line signal in readiness for loading into disc magnetic recorder 55, at the appropriate moment. Logic circuit 50 simultaneously monitors the output of disc magnetic recorder 55 to determine the proper time to load the video scan line from the delay line 45 into the recorder. At the proper time, the logic circuit switches electronic switch 57 to connect delay line 45 directly to clock 60, and switches electronic switch 64 on recorder 55 from the play mode to the record mode. The high frequency signal taken directly from clock 60 operates line 45 at the original high frequency mode to record the particular scan line therein into the recorder 55 of receiver 40. Recorder 55 thus functions as a signal reconstruction means which reconstructs and assembles the video signal a scan line at a time in the normal high frequency bandwidth.

As soon as delay line 45 has been unloaded and another scan line signal appears on input terminal 47, logic circuit 50 repeats the above cycle and loads the next video scan line into the signal reconstruction disc magnetic recorder 55. By this means, an entire video signal received from transmitter 10 over narrow bandwidth recording and/or transmitting means is reconstructed one video scan line at a time.

The selection of the number of storage elements in the variable delay lines 30 and 45 determines the frequency of the clocks 24 and 60. These in turn determine the $\div N_1$ factor for electronic divider 26, and influence the $\div N_2$ factor for dividers 34 and 63. Dividers 34 and 63 are also influenced by the frequency capacity of the narrow bandwidth recording and/or transmitting means which couples transmitter output terminal 35 with receiver input terminal 47. Clocks 24 and 60 operate at a frequency such that the number of clock cycles per 63.5 $\mu$sec. (horizontal scan time) equals the number of storage elements in the delay line, and the $\div N_1$ factor is chosen to equal the same number. The latter criterion causes one oscillator pulse to be applied to phase comparator 22 for each horizontal sync pulse received from magnetic disc recorder 14.

Figure 3A:
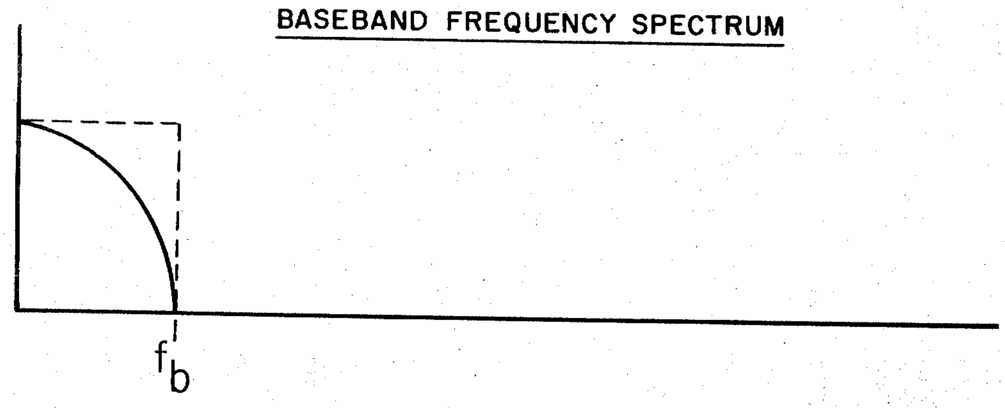
FIG. 3 is a graphical representation illustrating practical considerations entering into the provision of a guardband for noise suppression.
Figure 3B:
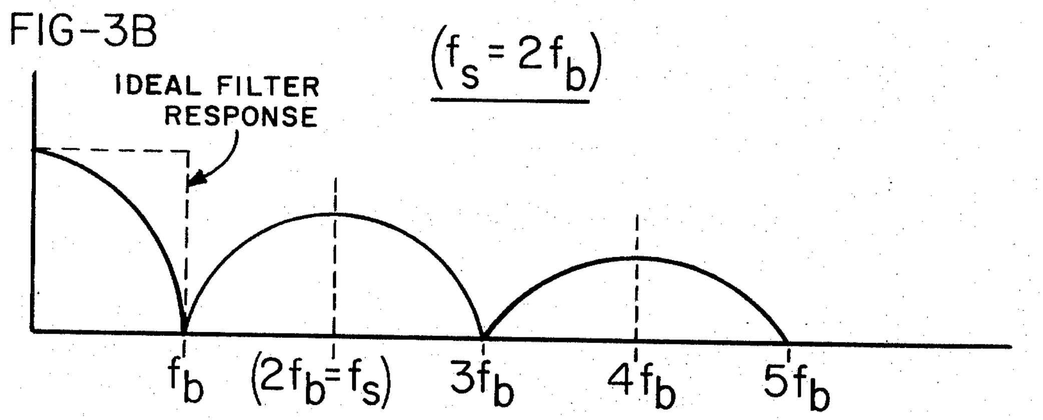

The number of storage elements in the delay line is chosen to exceed the line resolution requirements (along the horizontal direction) since the delay line (a bucket brigade or charge coupled device) is a sampling system. The sampling frequency itself must have a minimum limit of twice the original, high frequency baseband signal, according to the Nyquist criterion. However, the sampling process introduces noise and interference of its own which, in a practical system, must be removed. The use of the minimum Nyquist rate is therefore possible only if baseband recovery is accomplished using a theoretically perfect filter having infinitely steep roll off. FIG. 3A shows an illustrative baseband frequency spectrum. FIG. 3B shows the resulting output following "sampling" by the variable delay line storage means, and illustrates cutoff resulting from the use of a filter having an ideal response.

Figure 3C:
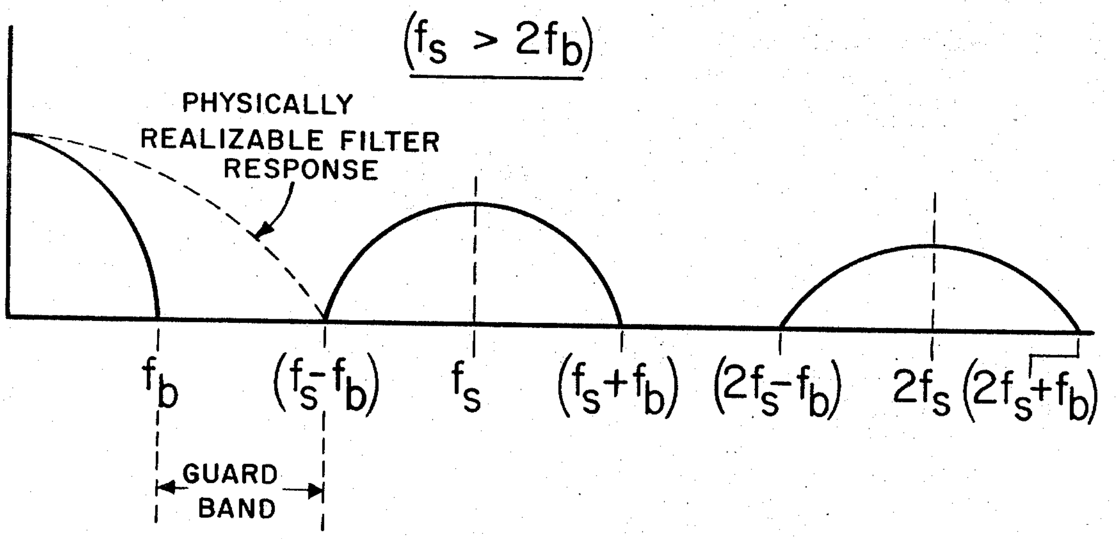

A realistic filter, however, has finite roll off (FIG. 3C) and hence a sampling rate of more than twice the baseband is needed in order to provide a sufficient guardband (FIG. 3C) between the desired baseband sample components and the higher frequency sampling-generated noise. Thus, since the number of lines of resolution is otherwise directly proportional to the baseband bandwidth, more storage elements are required in delay lines 30 and 45 than would be theoretically required to process the baseband signal itself. (One storage element equates to the amplitude information of one sample.) In the case of the single storage delay lines 30 and 45 of this invention, an entire video scan line is stored, and the equation determining the number of storage elements E is:

$$E = f_s \times 1/f_h$$

$$f_s = 2f_b + f_g$$

$$f_b = (L)/(1/f_h - T_{sync})$$

Where:

$f_s$ = sample frequency $f_h$ = horizontal line frequency $f_b$ = baseband bandwidth $f_g$ = guardband bandwidth L = total number of lines of resolution along the horizontal axis $T_{sync}$ = time required for horizontal sync and back and front porch (~ 10 $\mu$sec for EIA format)

Hence, knowing the number of lines of resolution required, the horizontal scan rate, and the required guardband (a function of the filter), the number E of storage elements in the delay line can be calculated. $N_1$ can then be calculated since its function in the phase locked loop requires that $f_h = f_s/N_1$, where $N_1$ must be an integer.

As may be seen, therefore, this invention has numerous advantages. It enables video television signals to be recorded and/or transmitted without loss of resolution over media having frequency and bandwidth capabilities orders of magnitude lower than that required for the television signal itself. The invention may therefore be used wherever real time reproduction of the television signal is not required, since it obviously takes a longer time to process the signal due to the slow rate at which the information is handled in the recording and/or transmitting media. The present invention is therefore particularly advantageous where a single frame is to be displayed over a period of time, as with instructional material. In such a case, disc magnetic recorder 55 in receiver 40 can continuously display an earlier reconstructed frame while simultaneously slowly reconstructing the next frame to be shown by using two record/reproduce transducers. At the appropriate time, the next frame is displayed while receiver 40 continues processing the incoming signal for preparation of the still next frame to be displayed, and so on. High resolution television displays are therefore made readily feasible on inexpensive equipment, and may be transmitted easily and inexpensively over low bandwidth media. Transmission and reception a line at a time is highly preferred due to switching and synchronization problems. It is possible, of course, to process the signal in larger segments than one line, or in segments somewhat shorter than one line, although this is not preferred.

While the method herein described, and the form of apparatus for carrying this method into effect, constitute preferred embodiments of this invention, it is to be understood that the invention is not limited to this precise method and form of apparatus, and that changes may be made in either without departing from the scope of the invention.

What is claimed is:

1. An apparatus for transmitting television signals over narrow bandwidth channel means, comprising:

a. signal source means including means for controllably presenting a pre-recorded television signal one video scan line at a time at normal high frequency bandwidth, b. storage means having selectable high and low speed modes, c. means connecting said signal source means to said storage means, d. means for connecting said storage means to the narrow bandwidth channel means, and e. means controlling said source means and said storage means:

i. to read one video scan line at normal, high frequency bandwidth and simultaneously to operate said storage means in high speed mode to load said one scan line into said storage means, and ii. to operate said loaded storage means in low speed mode consistant with the narrow bandwidth of the channel means for presenting the video scan line thereto as a signal of lower bandwidth, said controlling means sequentially controlling said source means and said storage means for presenting an entire video signal to the narrow bandwidth channel means one video scan line at a time.

2. The apparatus of claim 1 wherein said signal source means includes a disc magnetic recorder.

3. The apparatus of claim 1 wherein said means for connecting to the channel means includes an FM modulator.

4. An apparatus for receiving television signals from narrow bandwidth channel means, comprising:

a. signal reconstruction means including means for controllably recording a television signal one video scan line at a time at normal high frequency bandwidth, b. storage means having selectable high and low speed modes, c. means connecting said signal reconstruction means to said storage means, d. means for connecting said storage means to the narrow bandwidth channel means, and e. means controlling said reconstruction means and said storage means, i. to operate said storage means in low speed mode consistant with the narrow bandwidth of the channel means for loading a video scan line received therefrom as a signal of lower bandwidth, and ii. to operate said storage means and said signal reconstruction means simultaneously in normal, high speed mode to record said one scan line from said storage means into said signal reconstruction means as a signal of high bandwidth, said controlling means sequentially controlling said reconstruction means and said storage means for reconstructing an entire video signal received from the narrow bandwidth channel means one video scan line at a time.

5. The apparatus of claim 4 wherein said signal reconstruction means includes a disc magnetic recorder.

6. The apparatus of claim 4 wherein said means for connecting to the channel means includes an FM demodulator.

7. The method of transmitting a television signal over a narrow bandwidth channel means, comprising:

a. loading a single scan line of the television signal at normal, high frequency into a storage means having selectable high and low speed modes, b. operating the storage means at high speed mode during said loading, c. operating the loaded storage means at low speed mode consistent with the narrow bandwidth of the channel means for presenting the video scan line thereto as a signal of lower bandwidth, and d. repeating the foregoing steps to present an entire video signal to the narrow bandwidth channel means one video scan line at a time.

8. The method of receiving a television signal from a narrow bandwidth channel means, comprising:

a. loading a single, lower bandwidth scan line of the television signal into a storage means having selectable high and low speed modes, b. operating the storage means at low speed mode during said loading, c. operating the loaded storage means at high speed mode to reproduce the scan line therefrom as a signal of normal, high bandwidth, and d. repeating the foregoing steps to reconstruct an entire video signal from the narrow bandwidth channel means one video scan line at a time.

* * * * *